Figure 1:
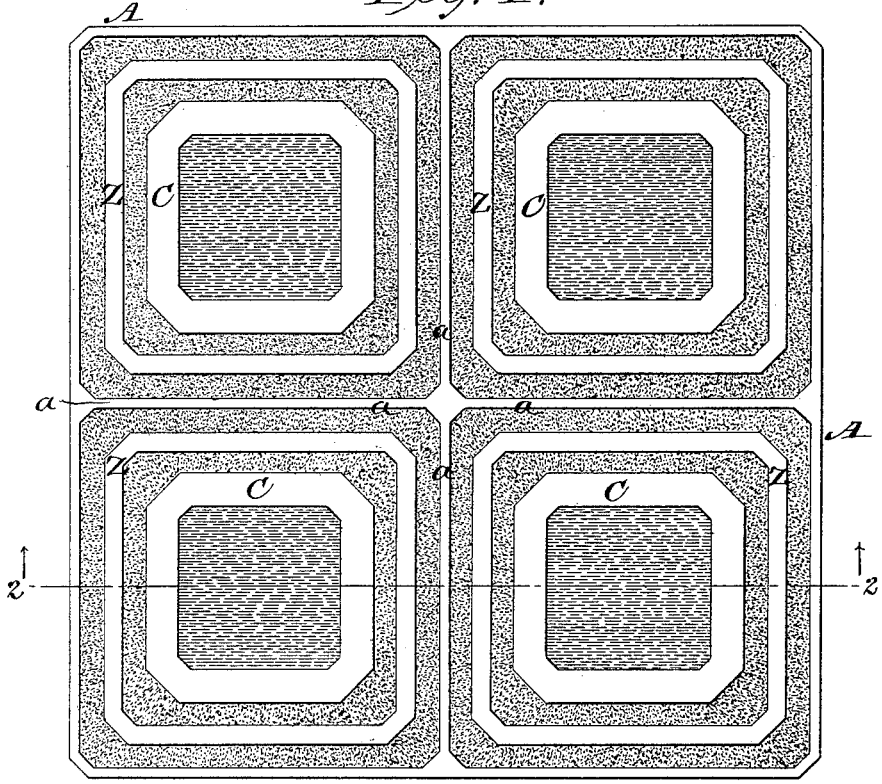

(No Model.)

D. M. LAMB.
ELECTRIC BATTERY.

No. 461,023. Patented Oct. 13, 1891.

Witnesses
H. C. Newman
Louis G. Julihn

Inventor
Daniel Martin Lamb,
By his Attorneys
Baldwin Davidson & Wight

UNITED STATES PATENT OFFICE.

DANIEL MARTIN LAMB, OF BOSTON, MASSACHUSETTS.

ELECTRIC BATTERY.

SPECIFICATION forming part of Letters Patent No. 461,023, dated October 13, 1891.

Application filed December 7, 1889. Serial No. 332,992. (No model.)

*To all whom it may concern:*

Be it known that I, DANIEL MARTIN LAMB, a citizen of the United States, residing at Boston, in the county of Suffolk and State of Massachusetts, have invented or discovered certain new and useful Improvements in Electric Batteries, of which the following is a specification.

My invention relates both to a novel composition of active material for an electric battery and to an improved construction of battery-cell.

The objects of my invention are to secure a simple and effective electric battery capable of exerting a comparatively large electromotive force for a long period, which ends I attain by employing granular active material, having each granule enveloped in a water-repellent substance in my improved cell, hereinafter described.

To carry out the objects of my invention I mix certain of the following ingredients, preferably in the form of powder, mingle them with powdered rosin, and melt it in a suitable vessel, the effect of which is to cause the rosin to flow around and envelop the particles of other materials with which it is mixed and make a water-repellent composition, through which moisture permeates very slowly indeed. The mingling of the heated rosin with the mixture causes it to boil up, swell, or work in such manner as to form granules, which roll over each other and become thoroughly and separately coated with the rosin. This mixture, which is in the form of water-repellent granules or coarse powder, I place in a cell composed of ordinary glass or porcelain containing a zinc element, preferably of a tubular form, inclosing a similarly-formed carbon element, preferably made soft and porous, so as to be readily permeable by moisture. The carbon element I fill, preferably, with small lumps of black oxide of manganese covered with water. The water-repellent powder above mentioned is inserted between the zinc and carbon element and also between the zinc element and the wall of the jar. The elements are connected either for quantity or tension, or both, in the usual ways.

Among the numerous substances employed by me as the active material of my battery I have found the following to be the best adapted for the purpose I had in view, namely: ammonia, bromine, cadmium, chlorine, cobalt, copper, iodine, iron, lime, manganese, mercury, potash, soda, and sulphur.

The best results have been obtained with sal-ammoniac, sulphate of copper, perchloride of iron, chloride of lime, black oxide of manganese, bisulphide of mercury, bichromate of potash, bichromate of soda, carbonate of soda, and even common salt.

I find the use of rosin in the proportion of about one-fourth of the other ingredients combined to answer the purpose admirably.

I have found the following compound to operate advantageously, namely: sulphate of copper, one part; black oxide of manganese, two parts; bichromate of soda or bichromate of potash, carbonate of soda, and lime, four parts each, and rosin, four parts.

The following constitutes another effective composition: sal-ammoniac, bichromate of potash, carbonate of soda, and rosin, eight ounces each; sulphate of copper and black oxide of manganese, four ounces each, and bisulphate of mercury, one-half ounce.

Another successfully-used composition consists of bichromate of potash and bichromate of soda, four ounces each; carbonate of soda, lime, and rosin, eight ounces each; black oxide of manganese, six ounces, and sulphate of copper, two ounces.

Of course the quantities and proportions of these various compositions may be varied within certain limits without impairing the efficiency of the combination.

Either or all of these compositions may be treated with chlorine gas in well-known ways before being put into the battery. I prefer to subject them to the action of the gas under pressure.

In preparing these compounds I have sometimes substituted nitrates of bromine, cadmium, cobalt, or iodine for the soda compound; but prefer the latter, as it is cheaper and equally if not more efficacious.

In order to carry out my invention in the best manner, I have devised a new form of battery-cell, as shown in the accompanying drawings, in which—

Figure 2:
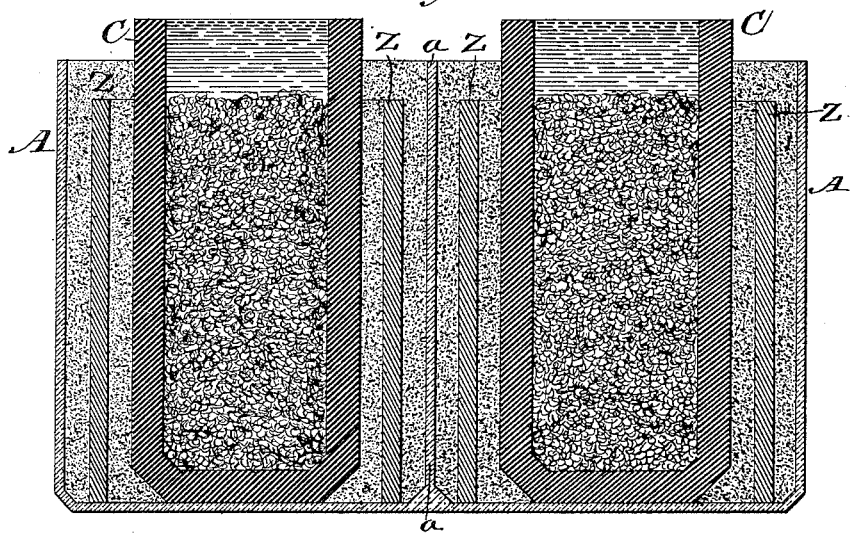

Figure 1 represents a plan view of a compound cell consisting of four elements or single cells, and Fig. 2 a vertical transverse section therethrough on the line 1 1 of Fig. 1.

Except as otherwise indicated the parts are of the usual construction and material.

The containing-vessel A is divided into water-tight compartments by vertical transverse partitions $a$, within each of which rests a tubular open-ended zinc electrode Z, preferably of less height than the transverse partitions, with which its walls are parallel, it being of somewhat less dimensions than its inclosure, so as to leave a lateral space of from, say, a quarter to a half inch between them. The zinc element in like manner surrounds a smaller cup or cell C, consisting of soft porous carbon, readily permeable with water. This cup C is open at top and projects above this inclosing case.

The compound cell may be provided with a cover, if desired; but it need not be air-tight.

The spaces between the carbon and zinc elements, as well as that between the latter element and the inclosing casing, are filled with the composition described up to about the top of the zinc element. By "composition described" I mean a compound such as one of those hereinafter indicated. The interior of the carbon cell is filled to about the same level, preferably with granules or pellets of black oxide of manganese, of what is known in the trade as "pea size." The carbon cup is then filled with water, which gradually oozes through its walls and permeates the surrounding composition of active material, and constitutes the exciting-fluid. As each particle of the powder composing the active material has previously been coated with the rosin, constituting a water-repellent covering, the moisture gradually acts on the composition.

Other known resins or gums might be substituted in this composition for rosin as the enveloping material; but many of them are more expensive, some not so suitable, and others less effective, as my experiments have demonstrated.

The elements are connected in the ordinary way, according as quantity or intensity is desired, and the circuit connections, being well known, are not shown in the drawings.

It is obvious that the form or organization of the battery or elements may be varied in various well-known ways without departing from the principle of my invention. For instance, my improved compounds would do very effective work in combination with the ordinary Daniels or Leclanché batteries, these being the ones in most general use at the present day.

The drawings show the cell and elements as of rectangular form, with squared or rounded corners, as this form affords obvious advantages in manufacture, manipulation, and economy of space.

The use of the composition in the form of powder, each particle of which is individually water-repellent, affords an obvious advantage in view of the large surface thus exposed to the action of the exciting-fluid.

What I claim as of my own invention, and desire to secure by Letters Patent, is—

1. The hereinbefore-described method of preparing active material for electric batteries, which consists in enveloping the individual granules or particles thereof with a water-repellent substance, such as rosin.

2. The hereinbefore-described active material for a battery, consisting of a composition in the form of granules or coarse powder, each of whose particles is separately enveloped with a water-repellent substance, such as rosin.

3. The hereinbefore-described method of preparing active material for electric batteries, which consists in mixing the various ingredients with rosin, all in the form of powder, and subjecting them to the action of heat, preferably in a closed vessel, to exclude atmospheric air, whereby each particle of the composition is enveloped in the rosin or equivalent resinous water-repellent material.

4. As active material for a battery, a compound of powdered sulphate of copper, black oxide of manganese, bichromate of soda or bichromate of potash, carbonate of soda, and lime in about the proportion described, with its particles or granules each separately enveloped with a resinous water-repellent material.

5. Battery active material consisting of powdered sal-ammoniac, bichromate of potash, carbonate of soda, sulphate of copper, black oxide of manganese, bisulphate of mercury, and a resinous water-repellent coating or envelope inclosing each separate granule of the mixture.

6. The combination, substantially as and about in the proportions specified, of bichromate of potash, bichromate of soda, carbonate of soda, lime, black oxide of manganese, and sulphate of copper pulverized and enveloped with resinous water-repellent material inclosing each separate granule of the mixture.

7. A battery-cell consisting of the combination of a porous cup of soft carbon, a zinc tube surrounding it, and an inclosing vessel, the spaces between the zinc and carbon and zinc and inclosing vessel being filled with granulated active material, each separate granule of which is inclosed in water-repellent material, the cup itself containing pellets of granulated black oxide of manganese and water.

8. The hereinbefore-described compound battery cell consisting of the inclosing vessel, its vertical transverse partitions constituting compartments, each containing a zinc tube inclosing a cup of soft porous carbon filled with granules of black oxide of manganese and water, the spaces between the zinc and carbon and zinc and partition being filled with a composition having its granules separately coated with resinous water-repellent material.

In testimony whereof I have hereunto subscribed my name.

DANIEL MARTIN LAMB.

Witnesses:
  WM. D. BALDWIN,
  BALTUS DELONG.